United States Patent
Sopcic et al.

(10) Patent No.: US 9,753,467 B2
(45) Date of Patent: Sep. 5, 2017

(54) SYSTEM AND METHOD FOR CONTROLLING TURBINE SPEED USING TORQUE CONVERTER

(71) Applicant: General Electric Company, Schenectady, NY (US)

(72) Inventors: Paige Marie Sopcic, Greenville, SC (US); Jason Dean Fuller, Simpsonville, SC (US); Daniel Richard Waugh, Simpsonville, SC (US); Justin Aaron Allen, Greenville, SC (US)

(73) Assignee: General Electric Company, Schenectady, NY (US)

( * ) Notice: Subject to any disclaimer, the term of this patent is extended or adjusted under 35 U.S.C. 154(b) by 672 days.

(21) Appl. No.: 14/220,858

(22) Filed: Mar. 20, 2014

(65) Prior Publication Data

US 2015/0268676 A1 Sep. 24, 2015

(51) Int. Cl.
| | |
|---|---|
| *F16H 61/64* | (2006.01) |
| *G05D 27/02* | (2006.01) |
| *F02C 7/275* | (2006.01) |
| *F02C 7/36* | (2006.01) |
| *F02C 9/20* | (2006.01) |
| *G01M 15/14* | (2006.01) |

(52) U.S. Cl.
CPC ............ *G05D 27/02* (2013.01); *F02C 7/275* (2013.01); *F02C 7/36* (2013.01); *F02C 9/20* (2013.01); *F16H 61/64* (2013.01); *F05D 2210/11* (2013.01); *F05D 2220/76* (2013.01); *F05D 2260/406* (2013.01); *F05D 2270/02* (2013.01); *F05D 2270/304* (2013.01); *G01M 15/14* (2013.01); *Y02E 10/722* (2013.01)

(58) Field of Classification Search
CPC .... F02C 7/36; F02C 7/275; F02C 7/27; F02C 7/268; F02C 9/20; F05D 2270/02; F05D 2270/304; F05D 2210/11; F05D 2260/406; G01M 15/14; F16H 41/22; F16H 41/26; F16H 41/28; F16H 61/64

See application file for complete search history.

(56) References Cited

U.S. PATENT DOCUMENTS

| | | | | |
|---|---|---|---|---|
| 3,124,973 | A | * | 3/1964 | Egbert .................... F16H 61/64 475/42 |
| 3,992,880 | A | * | 11/1976 | McCutcheon .......... F16H 61/64 60/327 |
| 7,422,543 | B2 | | 9/2008 | Ransbarger et al. |
| 8,355,855 | B2 | | 1/2013 | Minto et al. |

(Continued)

OTHER PUBLICATIONS

European Search Report and Opinion issued in connection with corresponding EP Application No. 15159548.5 on Sep. 3, 2015.

*Primary Examiner* — Erin D Bishop
(74) *Attorney, Agent, or Firm* — Fletcher Yoder PC

(57) ABSTRACT

A tangible non-transitory computer readable medium may include instructions to analyze a first signal indicative of a speed of a turbine system and transform the first signal into a second signal. The tangible non-transitory computer-readable medium may also include instructions to transmit the second signal to control a speed of the turbine system by actuating a field device. Actuating the field device may include controlling a fluid level in a torque converter mechanically coupled to the turbine system, and the speed may be below a minimum setpoint of the turbine system.

19 Claims, 4 Drawing Sheets

(56) References Cited

U.S. PATENT DOCUMENTS

| | | |
|---|---|---|
| 2010/0287948 A1 | 11/2010 | Draper et al. |
| 2011/0048119 A1 | 3/2011 | Hansen et al. |
| 2013/0061601 A1 | 3/2013 | Fuller et al. |
| 2013/0084179 A1* | 4/2013 | Mantese ............... F01D 17/162 |
| | | 416/1 |

* cited by examiner

SYSTEM AND METHOD FOR CONTROLLING TURBINE SPEED USING TORQUE CONVERTER

BACKGROUND

The subject matter disclosed herein relates to turbomachinery systems. Specifically, the embodiments described herein relate to controlling the speed of a turbine in a turbomachinery system.

In a turbomachinery system, such as a gas turbine system, a starting motor and torque converter may be coupled, for example, in series to the turbine to accelerate the turbine. The starting motor provides an input torque to the torque converter, which converts the input torque to an output torque that is provided to the turbine and causes a turbine shaft to rotate. The torque converter contains guide vanes, with the position of the guide vanes determining the amount of torque that is converted and subsequently the speed of the turbine. A control system in the turbomachinery system may control the starting motor and torque converter to manage the turbine speed according to a desired acceleration profile or steady-state condition.

In current turbomachinery systems that employ a starting motor and torque converter, once the system has started operation and the torque converter has been filled with fluid, there may be a minimum threshold for the turbine speed. This minimum speed may be defined by the drive line mechanical limitations of the turbine and may be met when the guide vanes of the torque converter are closed to a minimum position (e.g., minimum setpoint). However, there may be situations in which it would be beneficial to reduce the speed of the turbine further below the minimum setpoint. For example, in emergency situations, it may be useful to reduce the turbine speed below the minimum instead of performing a complete shutdown of the turbomachinery system. In another example, reducing the turbine speed below the minimum setpoint may provide an opportunity to gather validation and testing data (e.g. stall validation and compressor mapping) that may be useful to operators and engineers in making informed decisions. Additionally, reducing the turbine speed below the minimum setpoint may extend the operating range of the turbomachinery system such that it can support low to medium loads or be used in off-duty conditions.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system may include a turbine system configured to produce power and a starting motor configured to rotate a first shaft included in the turbine system. The system may also include a torque converter mechanically coupled to the first shaft and mechanically coupled to the turbine system. Finally, the system may include a control system that includes a processor configured to control a speed of the turbine system by controlling a fluid level in the torque converter to arrive at a first turbine system speed below a minimum setpoint.

In a second embodiment, a system may include a controller that includes a processor configured to receive a first signal indicative of a speed of a turbine system and transform the first signal into a second signal. The processor may also be configured to transmit the second signal to control a desired speed of the turbine system by actuating a field device. Actuating the field device may include controlling a fluid level in a torque converter mechanically coupled to the turbine system to arrive at the desired speed, wherein the desired speed is below a minimum setpoint of the turbine system.

In a third embodiment, a tangible non-transitory computer readable medium may include instructions to analyze a first signal indicative of a speed of a turbine system and transform the first signal into a second signal. The tangible non-transitory computer-readable medium may also include instructions to transmit the second signal to control a speed of the turbine system by actuating a field device. Actuating the field device may include controlling a fluid level in a torque converter mechanically coupled to the turbine system, and the speed may be below a minimum setpoint of the turbine system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. When a set of guide vanes is described as closed, it is intended to mean that the blades of the guide vanes are positioned at a relatively small angle. When a set of guide vanes is described as open, it is intended to mean that the blades of the guide vanes are positioned at a relatively large angle. The phrases "minimum drive line mechanical speed," "minimum setpoint," and "minimum speed" may all refer to a minimum speed of a turbine when associated guide vanes are closed.

Present embodiments relate to systems and methods for controlling turbine speed in turbomachinery systems. Specifically, the embodiments described herein relate to reducing turbine speed below a minimum setpoint determined by the drive line mechanical limitations of the turbine. The techniques described herein relate to a full or partial drain of fluid from a torque converter within the turbomachinery system that, in conjunction with a starting motor, accelerate the turbine. The techniques may include automatically draining and/or refilling of the fluid in the torque converter once the desired speed is reached. By providing systems and methods to reduce turbine speed below the associated minimum setpoint, the present embodiments may provide an alternative to a complete shutdown of the turbomachinery system, for example, in emergency situations, add opportunities to capture validation and testing data at low speeds, and extend the operating speed range of the turbomachinery system to include off-duty situations and low to medium loads, among other things.

Figure 1:
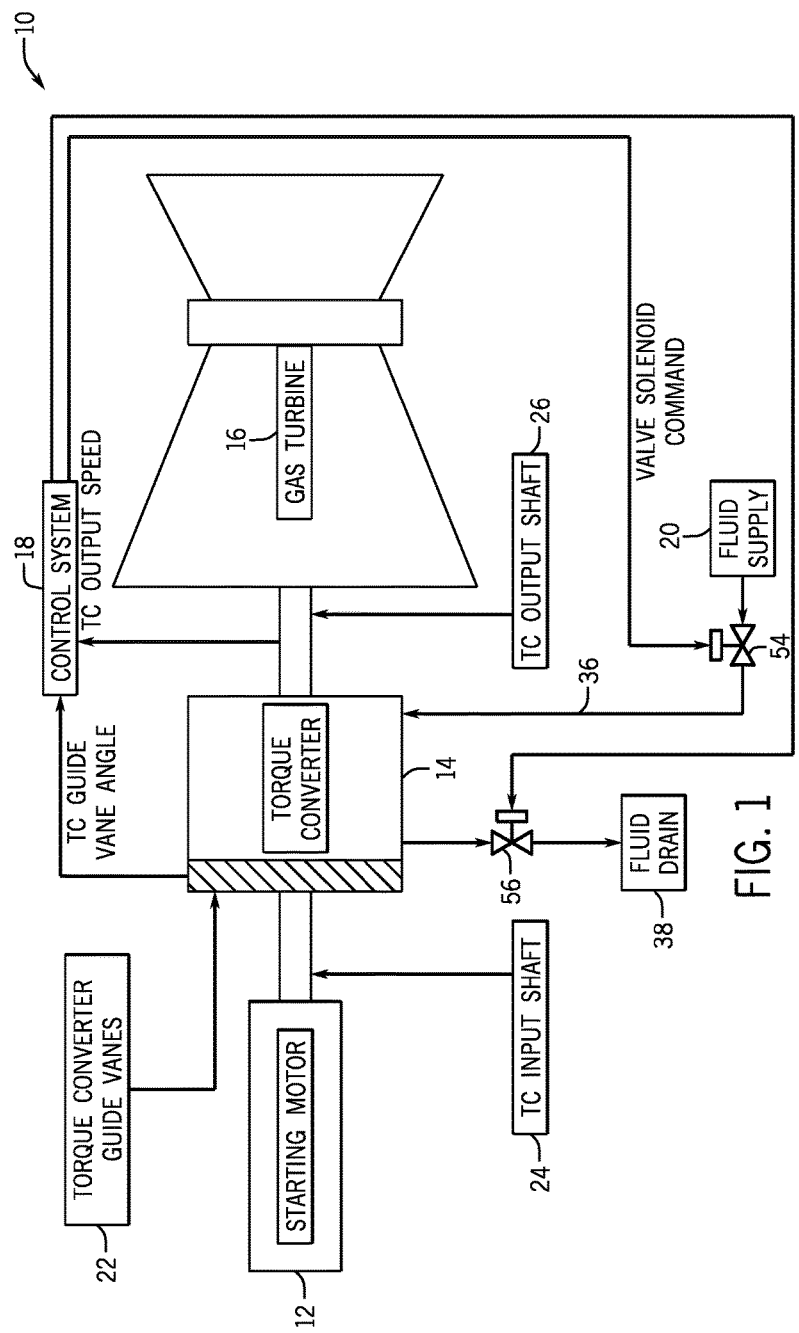
FIG. 1 is a block diagram illustrating a turbomachinery system, in accordance with an embodiment of the present approach.

With the foregoing in mind, FIG. 1 illustrates a turbomachinery system 10 that may be used to provide power to a load, such as an electric generator, a mechanical load, and so on. The turbomachinery system may include a starting motor 12, a torque converter 14, a turbine 16, a control system 18, and a fluid supply 20. The starting motor 12 may be an electric, pneumatic, or hydraulic motor or any other suitable device for rotating a shaft. The torque converter 14 may include guide vanes 22 that may be used to directly and/or indirectly control certain aspects of the turbomachinery system 10, such as the amount of torque provided by the torque converter 14 and the speed of the turbine 16. The turbine 16 may be a gas turbine system, steam turbine system, hydro turbine system, wind turbine system, turbo expander system, or centrifugal pump system. For example, FIG. 1 depicts a gas turbine 16 configured to generate power and/or electricity from the combustion of combustible materials (e.g., carbonaceous fuel).

As shown in FIG. 1, the starting motor 12 may be coupled to the torque converter 14 via a torque converter (TC) input shaft 24, and the torque converter 14 may be coupled to the turbine 16 via a TC output shaft 26. The starting motor 12 may transmit an input torque to the torque converter 14 via the input shaft 24. In the depicted embodiment, with the torque converter 14 filled with fluid, an angle (e.g., pitch) of the guide vanes 22 of the torque converter 14 may determine an amount of power the torque converter 14 draws from the starting motor 12. Specifically, the starting motor 12 may not be able to transmit a relatively large input torque to the torque converter 14 if the guide vanes 22 are mostly closed but may be able to transmit the relatively large input torque to the torque converter 14 if the guide vanes 22 are substantially open or fully open. The control system 18 may control the angle of the guide vanes 22 such that the torque converter 14 does not draw too much power that may lead to undesired effects to the turbomachinery system 10.

The torque converter 14 may receive the input torque from the starting motor 12 and convert it to an output torque that is transmitted to the turbine 16. The torque converter 14 may include an impeller 28, a turbine 30, and a stator 32 contained within a housing 34. The torque converter may also contain fluid (e.g., oil) whose flow allows the torque converter 14 to operate. As such, the torque converter 14 may be coupled via a conduit 36 to the fluid supply 20, and a fluid supply valve 54 may be used to control the amount and/or rate of fluid flow from the fluid supply 20 to the torque converter 14. Further, as described below, the torque converter 14 may also be coupled to a fluid drain 38, and a fluid drain valve 56 may be used to control the amount and/or rate of fluid flow from the torque converter 14 to the fluid drain 38.

Figure 2:
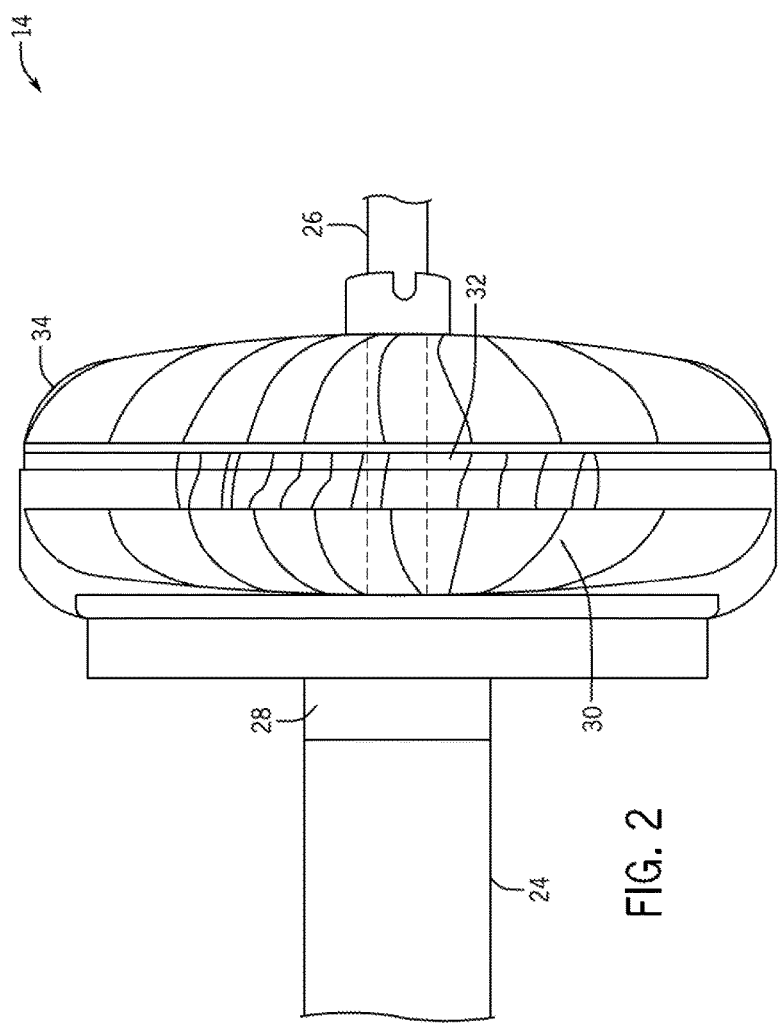
FIG. 2 is a cross-sectional torque converter included in the turbomachinery system of FIG. 1, in accordance with an embodiment of the present approach.

It may be beneficial to describe further operations of the torque converter 14. Accordingly, turning now to FIG. 2, the figure shows further details of an embodiment of the torque converter 14 shown in FIG. 1. In the depicted embodiment, the impeller 28 may be coupled to the TC input shaft 24 while the turbine 30 may be coupled to the TC output shaft 26, as shown in the cross-sectional view of FIG. 2. The stator 32 may be disposed between the impeller 32 and the turbine 30, but may not be directly coupled to either of the elements. During operation of the torque converter 14, the impeller 28 may spin and "push" or bias the fluid against the turbine 30, causing the turbine 30 and the TC output shaft 26 to spin. The stator 32, which includes its own set of guide vanes 22, may control the amount of fluid that the impeller 28 biases against the turbine 30; the movement of the stator 32 may determine how much of the fluid the guide vanes 22 redirects back to the impeller 28. Once the fluid has been "pushed" against the turbine 30, the stator 32 may move to allow the fluid to flow back to the impeller 28.

The control system 18 (shown in FIG. 1) may control the angle of the guide vanes 22 to set the amount of torque converted by the torque converter 14 by directing fluid flow within the torque converter 14. For example, when the angle of the guide vanes 22 is broad, fluid flow may be permitted such that a relatively substantial fraction of the fluid flows from the impeller 28 to the turbine 30 such that a substantial fraction of the input torque is converted to output torque. However, when the angle of the guide vanes 22 is shallow, the fluid flow may be restricted such that only a relatively small fraction of the fluid flows from the impeller 28 to the turbine 30 such that only a relatively small fraction of the input torque is converted to output torque. The output torque may be controlled by the control system 18 to control the speed of the TC output shaft 26.

Referring back to the turbomachinery system of FIG. 1, an additional starting motor and torque converter may be coupled in series to the starting motor 12 in some embodiments. The additional starting motor may have a substantially lower rating than the original starting motor 12. As a result, the additional starting motor and torque converter may be used primarily for low to medium loads (e.g. starting the turbomachinery system 10.)

Figure 3:
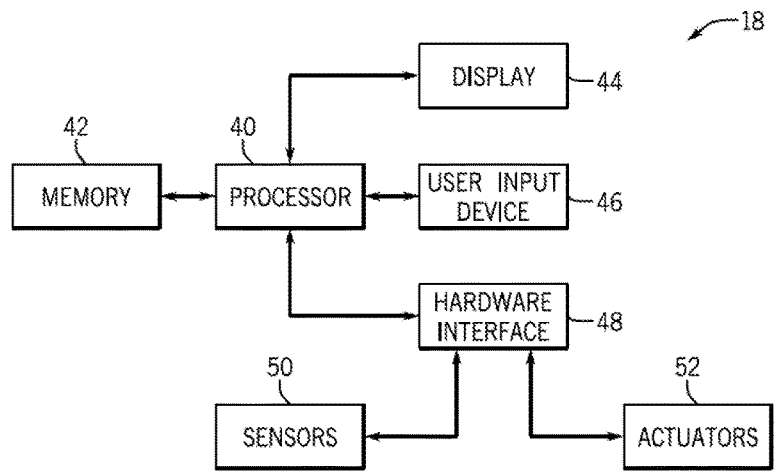
FIG. 3 is a block diagram illustrating a control system in the turbomachinery system of FIG. 1, in accordance with an embodiment of the present approach.

Turning now to FIG. 3, the control system 18 may generally manage various facets of the turbomachinery system 10, such as controlling the angle of the guide vanes 22. Accordingly, the control system 18 may include a processor 40, memory 42, display 44, a user input device 46, and a hardware interface 48 used by the processor 40 to communicate with sensors 50 and actuators 52, as shown in the embodiment of FIG. 3. As depicted, the processor 40 and/or other data processing circuitry may be operably coupled to memory 42 to retrieve and execute instructions for managing the turbomachinery system 10. For example, these instructions may be encoded in programs that are stored in memory 42, which may be an example of a tangible, non-transitory computer-readable medium, and may be accessed and executed by the processor 40 to allow for the presently disclosed techniques to be performed. The memory 42 may be a mass storage device, a FLASH memory device, removable memory, or any other non-transitory computer-readable medium. Additionally and/or alternatively, the instructions may be stored in an additional suitable article of manufacture that includes at least one tangible, non-transitory computer-readable medium that at least collectively stores these instructions or routines in a manner similar to the memory 42 as described above. The control system 18 may also include the display 44 for a user to view various data regarding the turbomachinery system 10 and a user input device 46 (e.g., a keyboard, mouse, touchscreen, gesture input device, etc.) to allow the user to interact with the control system 18.

The control system 18 may also communicate with sensors 50 and actuators 52 via the hardware interface 48. The control system 18 may monitor the current state of the turbomachinery system 10 using various sensors 50 such rotational speed sensors on the starting motor 12, the input shaft 24, the torque converter 14, the output shaft 26, and the turbine 16; fluid-level sensors in the torque converter 14, the fluid supply 20, and the fluid drain 38; and position sensors on the guide vanes 22. Other sensors 50 may include pressure sensors, temperature sensors, clearance sensors (e.g., distance between stationary and rotary components), fluid flow sensors, and the like. The control system 18 may alter the state of the components of the turbomachinery system 10 by using actuators 52; these may include valves, pumps, positioners, inlet guide vanes, switches, and so on, useful in performing control actions. For example, referring back to FIG. 1, the control system 18 may control the fluid flow into and out of the torque converter 14 via a fluid supply valve 54 and a fluid drain valve 56 coupled to the fluid supply 20 and the fluid drain 38 respectively. The fluid supply valve 54 and the fluid drain valve 56 may be a solenoid or modulating valve. Alternately or additionally, the control system 18 may use actuators 52 to control the acceleration and deceleration rate of the fluid flow from the fluid supply 20 or to the fluid drain 38. Further, the control system 18 may also use position sensors 50 on the fluid supply 46 and the fluid drain valve 56 to monitor the current position of the valves.

In some embodiments, the control system 18 (excluding the sensors 50 and actuators 52) may be a single device, such as a bang/bang controller (e.g., hysteresis controller switching between two states), a proportional integral derivative (PID) controller, a model based controller (MBC), and/or a setpoint controller. For those embodiments, the control system 18 may be an autonomous controller within a larger distributed control system for the turbomachinery system 10. In other embodiments, the control system 18 (including the sensors 50 and actuators 52) may be directed as part of a larger distributed control system for the turbomachinery system 10.

As mentioned above, among other things, the control system 18 may control the amount of power the torque converter 14 draws from the starting motor 12, the amount of torque converted by the torque converter 14, and the speed of the turbine 16. To do so, the control system 18 may be configured to receive current condition data of the turbomachinery system 10, determine a current input power supplied by the staring motor 12, and determine a current output power supplied by the torque converter 14. Specifically, the control system 18 may be configured to receive a control signal representative of the input torque and compare it to rating data of the starting motor 12. The rating data of the starting motor 12 may be stored on the memory 42. Based on the comparison, the control system 18 may adjust the angle of the guide vanes 22 to prevent the torque converter 14 from drawing undesired power from the staring motor 12 while still adhering as much as possible to a desired acceleration profile for the turbine 16. In some embodiments, the control system 18 may also receive a control signal represent of the output torque and a control signal representative of turbine speed to use in determining the adjustment to the angle of the guide vanes 22.

For a turbomachinery system 10 that includes a starting motor 12 and torque converter 14, there may be a minimum setpoint for the speed of the turbine 16. Once the turbine 16 is turned on, the speed may not be lower than that setpoint without completely shutting down the turbine 16. This minimum setpoint may be defined by the drive line mechanical limitations of the turbine 16 and may be met when the guide vanes 22 are closed.

However, there may be several types of situations in which it may be useful to reduce the speed of the turbine 16 below the minimum setpoint. For example, it may be preferred to reduce the turbine speed below the minimum setpoint rather than completely shut down the turbomachinery system 10. Reducing the speed of the turbine 16 may below the minimum setpoint may also provide an opportunity to capture validation and testing data (e.g. stall validation and compressor mapping) which may be provided to operators and engineers for more informed decision-making. Additionally, being able to reduce the turbine speed below the minimum setpoint may allow operators to extend the operating range of the turbomachinery system 10 to include off-duty situations and low to medium loads.

To reduce the speed of the turbine 16 below the minimum setpoint, the control system 18 may drain fluid from the torque converter 14 via the fluid drain 38 to reduce the output torque. This may be a partial or complete drain. In one embodiment, the draining may occur only when the guide vanes 22 are closed. Depending on the type of fluid used, the fluid drained from the torque converter 14 may be "recycled," that is, sent back to the fluid supply 20.

Figure 4:
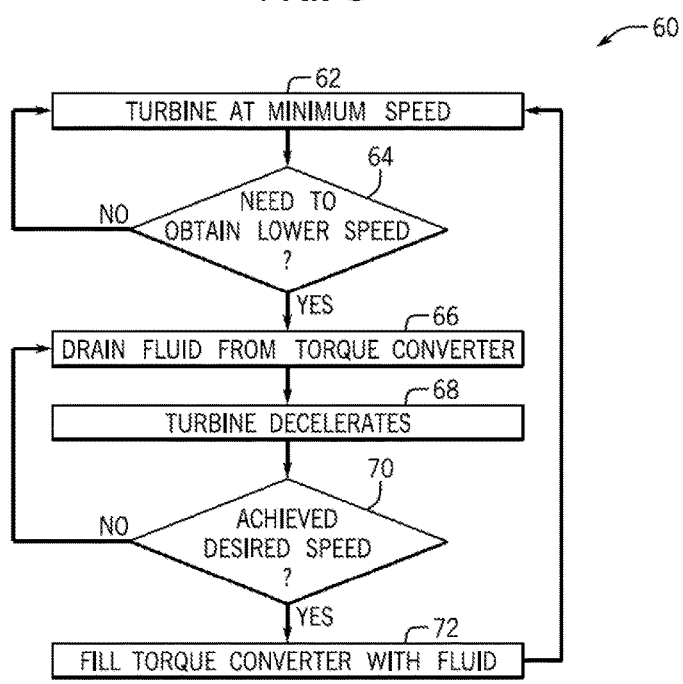
FIG. 4 is a flowchart depicting a method for reducing the speed of a turbine in the turbomachinery system of FIG. 1, in accordance with an embodiment of the present approach.

FIG. 4 illustrates an embodiment of a process 60 that the control system 18 may use to reduce the turbine speed below the minimum setpoint. The process 60 may be implemented as executable computer code stored in the memory 42 and executed by the processor 40. At block 62, the process 60 may have completely closed the guide vanes 22 such that the turbine 16 is at the minimum speed. Then, at decision 64, the process 60 may determine whether the turbine speed should be reduced below the minimum setpoint. If the turbine speed should not be reduced below the minimum setpoint, then the process 60 may proceed back to block 62. If the turbine speed should be reduced below the minimum setpoint, then the process 60 may proceed to block 66, in which it drains some or all of the fluid from the torque converter 14 to achieve the desired speed.

Figure 5:
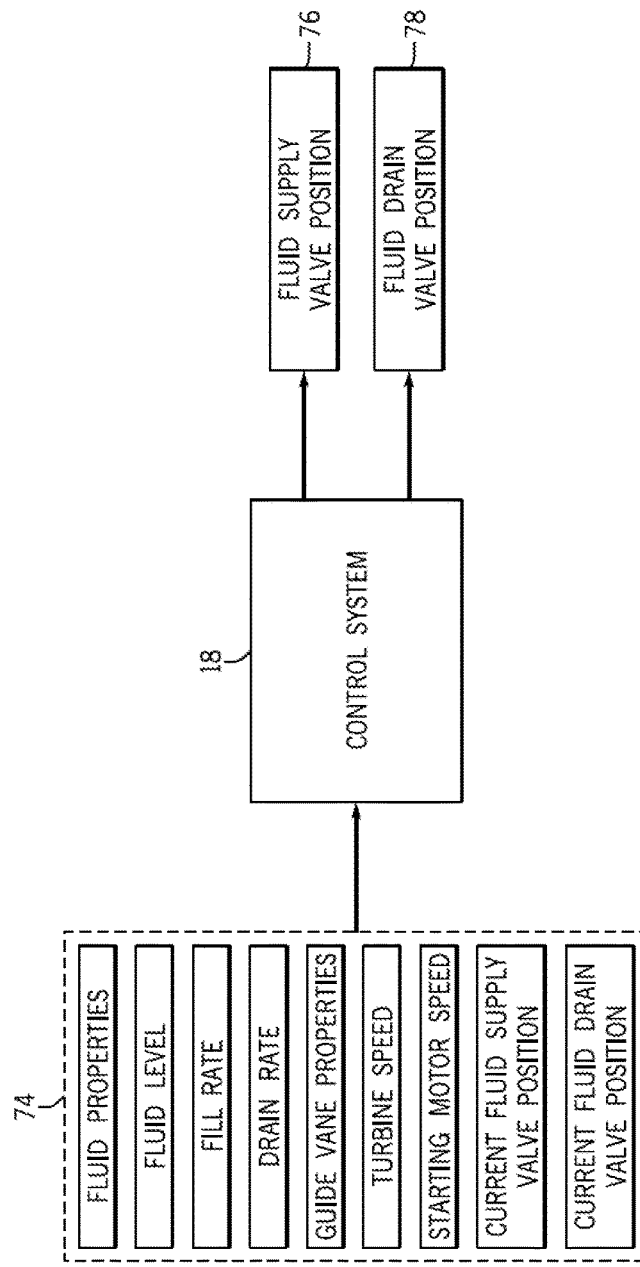
FIG. 5 is a block diagram depicting a particular step in the method of FIG. 4, in accordance with an embodiment of the present approach.

Referring now to FIG. 5, the process 60 may determine the amount of fluid to drain from the torque converter 14 based on a variety of inputs 74, as shown in the figure. The inputs 74 may include, among other things, the properties of the fluid in the torque converter 14 (e.g. viscosity, density, etc.), the current fluid level of the torque converter 14, the fill rate of the fluid, the drain rate of the fluid, the properties of the guide vanes 22 (e.g. the number and/or size of the blades), the speed of the turbine 16, and the speed of the starting motor 12. These values may be stored in memory 42 or may be determined using data from sensors 50. For example, the properties of various types of fluids in the torque converter 14 may be stored in memory. In another example, the current fluid level of the torque converter 14 may be determined by monitoring the power of the turbine 16 (i.e., when the power is near 0 MW the torque converter 14 is fully drained) or by using a fluid level sensor or flow meter. The inputs 74 may additionally or alternatively include current positions of the fluid supply valve 54 and the fluid drain valve 56. The control system 18 may process the inputs 74 to determine a new fluid supply valve position 76 and a new fluid drain valve position 78, and may then move the fluid supply valve 54 and the fluid drain valve 56 to their new positions.

Referring back to FIG. 4, once the process 60 has drained fluid from the torque converter 14 in block 66 and the turbine 16 has decelerated in block 68, the process 60 may determine whether the turbine 16 has reached the desired speed in decision 70. If the speed of the turbine 16 needs to be decreased further, the process 60 may proceed back to block 66 to drain more fluid from the torque converter 14. If the desired speed of the turbine 16 has been reached, the process 60 may proceed to block 72, at which it automatically fills the torque converter 14 to return the turbine 16 to the minimum setpoint speed before proceeding to block 62. In some embodiments, the process 60 may automatically fill the torque converter 14 such that it returns to a nominal speed setpoint other than the minimum setpoint. In yet other embodiments, the process 60 may not refill the torque converter 14 until it determines that the speed of the turbine 16 should be increased. By filling and draining the torque converter 14 alternative to or in addition to controlling the guide vanes 22, the techniques described herein may expand operations below a minimum drive line mechanical speed.

Technical effects of the invention include systems and methods to reduce the speed of a turbine in a turbomachinery system below the minimum setpoint defined by the drive line mechanical limitations of the turbine. The present embodiments may provide an alternative to a complete shutdown of the turbomachinery system in certain situations, an opportunity to capture validation and testing data, and a way to extend the operating range of the turbomachinery system to include off-duty situations and low to medium loads, among other things. The technical effects and technical problems in the specification are exemplary and not limiting. It should be noted that the embodiments described in the specification may have other technical effects and can solve other technical problems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
   a turbine system configured to produce power;
   a starting motor configured to rotate a first shaft included in the turbine system;
   a torque converter mechanically coupled to the first shaft and mechanically coupled to the turbine system; and
   a control system comprising a processor configured to determine the power of the turbine system,
   determine a fluid level in the torque converter based at least in part on the power of the turbine system; and
   control a speed of the turbine system by controlling the fluid level in the torque converter to arrive at a first turbine system speed below a minimum drive line mechanical speed of the turbine system.

2. The system of claim 1, wherein the torque converter comprises a plurality of guide vanes, and wherein the minimum drive line mechanical speed comprises a speed of the turbine system when the guide vanes are all closed and the torque converter is filled with a fluid, and wherein controlling the fluid level in the torque converter comprises draining substantially all of the fluid in the torque converter.

3. The system of claim 1, wherein controlling the fluid level in the torque converter comprises draining a portion of a fluid in the torque converter.

4. The system of claim 3, wherein the processor is configured to control a drain rate of the fluid in the torque converter.

5. The system of claim 1, wherein the control system comprises at least one of a bang/bang controller, a proportional integral derivative (PID) controller, a model based controller (MBC), a setpoint controller, or a combination thereof.

6. The system of claim 1, wherein the turbine system comprises at least one of a gas turbine system, a steam turbine system, a hydro turbine system, a wind turbine system, a turbo expander system, or a centrifugal pump system.

7. The system of claim 1, wherein the torque converter comprises guide vanes and a position sensor disposed on the guide vanes.

8. The system of claim 1, wherein the starting motor comprises an electric motor, a pneumatic motor, a hydraulic motor, or a combination thereof.

9. The system of claim 1, wherein controlling the fluid level in the torque converter comprises draining a fluid in the torque converter and subsequently refilling the torque converter with the fluid.

10. A system comprising a controller, the controller comprising a processor configured to:
    receive a first signal indicative of a current speed of a turbine system;
    transform the first signal into a second signal;
    transmit the second signal to control a desired speed of the turbine system by actuating an actuator;
    determine an output power of the turbine system; and
    determine the fluid level in the torque converter based on the output power of the turbine system; wherein the actuation of the actuator is configured to control a fluid level in a torque converter mechanically coupled to the turbine system to arrive at the desired speed, and wherein the desired speed comprises a first speed below a minimum drive line mechanical speed of the turbine system.

11. The system of claim 10, wherein the processor is configured to receive a third signal indicative of an output power of the torque converter and to transform the first and third signals into the second signal to control the desired speed of the turbine system.

12. The system of claim 11, wherein the processor is configured to receive a fourth signal indicative of an input torque of a starting motor mechanically coupled to the torque converter and to transform the first, third and fourth signals into the second signal to control the desired speed of the turbine system.

13. The system of claim 10, wherein the actuation of the actuator is configured to drain substantially all of a fluid in the torque converter.

14. The system of claim 10, wherein the actuation of the actuator is configured to drain a portion of a fluid in the torque converter.

15. The system of claim 10, wherein the actuation of the actuator is configured to drain a fluid in the torque converter and subsequently refill the torque converter with the fluid.

16. A tangible non-transitory computer readable medium comprising instructions that when executed by a processor cause the processor to:
    analyze a first signal indicative of a current speed of a turbine system;
    transform the first signal into a second signal;
    transmit the second signal to control a desired speed of the turbine system by actuating an actuator;
    determine a power output of the turbine system; and
    determine the fluid level in the torque converter based on the power output of the turbine system, wherein the actuation of the actuator is configured to control a fluid level in a torque converter mechanically coupled to the turbine system, and wherein the desired speed comprises a first speed below a minimum drive line mechanical speed of the turbine system.

17. The tangible non-transitory computer readable medium of claim 16, wherein the actuation of the actuator is configured to drain all of a fluid in the torque converter.

18. The tangible non-transitory computer readable medium of claim 16, wherein the actuation of the actuator is configured to drain a portion of a fluid in the torque converter.

19. The tangible non-transitory computer readable medium of claim 16, wherein the actuation of the actuator is configured to drain a fluid in the torque converter and subsequently refill the torque converter with the fluid.

* * * * *